United States Patent
Yang (10) Patent No.: US 8,059,737 B2
(45) Date of Patent: Nov. 15, 2011

(54) OFDM RECEIVER HAVING MEMORY CAPABLE OF ACTING IN A SINGLE-CHIP MODE AND A DIVERSITY MODE

(75) Inventor: Shun-An Yang, Changhua County (TW)

(73) Assignee: Mediatek Inc., Hsin-Chu (TW)

( * ) Notice: Subject to any disclaimer, the term of this patent is extended or adjusted under 35 U.S.C. 154(b) by 723 days.

(21) Appl. No.: 12/144,072

(22) Filed: Jun. 23, 2008

(65) Prior Publication Data

US 2009/0316820 A1 Dec. 24, 2009

(51) Int. Cl.
*H04L 27/28* (2006.01)

(52) U.S. Cl. ........ 375/260; 375/267; 375/259; 370/278; 455/59

(58) Field of Classification Search .................. 375/260
See application file for complete search history.

(56) References Cited

U.S. PATENT DOCUMENTS

| | | | | |
|---|---|---|---|---|
| 5,933,454 A * | 8/1999 | Cioffi | | 375/260 |
| 6,359,938 B1 * | 3/2002 | Keevill et al. | | 375/316 |
| 6,470,030 B1 * | 10/2002 | Park et al. | | 370/480 |
| 6,484,111 B1 * | 11/2002 | Nara | | 702/77 |
| 6,628,730 B1 * | 9/2003 | Stott et al. | | 375/344 |
| 6,650,617 B1 * | 11/2003 | Belotserkovsky et al. | | 370/210 |
| 6,912,258 B2 * | 6/2005 | Birru | | 375/340 |
| 7,496,618 B2 * | 2/2009 | Brown et al. | | 708/404 |
| 2002/0037058 A1 * | 3/2002 | Birru | | 375/340 |
| 2003/0137926 A1 * | 7/2003 | Joo et al. | | 370/203 |
| 2003/0142764 A1 * | 7/2003 | Keevill et al. | | 375/341 |
| 2004/0042543 A1 * | 3/2004 | Li et al. | | 375/222 |
| 2004/0081074 A1 * | 4/2004 | Piechocki | | 370/206 |
| 2004/0105506 A1 * | 6/2004 | Baek et al. | | 375/260 |
| 2007/0058735 A1 * | 3/2007 | Ghosh | | 375/260 |
| 2007/0071126 A1 * | 3/2007 | van Rooyen | | 375/267 |
| 2007/0206687 A1 * | 9/2007 | Ananth et al. | | 375/260 |
| 2007/0211619 A1 * | 9/2007 | Jalloul et al. | | 370/209 |
| 2007/0248002 A1 * | 10/2007 | Kim et al. | | 370/207 |
| 2007/0263738 A1 * | 11/2007 | Jitsukawa et al. | | 375/260 |
| 2008/0304463 A1 * | 12/2008 | Borkar et al. | | 370/342 |
| 2008/0304464 A1 * | 12/2008 | Borkar et al. | | 370/342 |
| 2009/0103832 A1 * | 4/2009 | Ortiz et al. | | 382/280 |
| 2009/0245091 A1 * | 10/2009 | Lin et al. | | 370/210 |
| 2009/0252237 A1 * | 10/2009 | Ma et al. | | 375/260 |
| 2010/0054368 A1 * | 3/2010 | Feng | | 375/340 |
| 2010/0080314 A9 * | 4/2010 | van Rooyen | | 375/267 |

FOREIGN PATENT DOCUMENTS

EP  045543 B1  9/2006

* cited by examiner

*Primary Examiner* — Chieh M Fan
*Assistant Examiner* — Santiago Garcia
(74) *Attorney, Agent, or Firm* — Thomas|Kayden (57) ABSTRACT

An OFDM receiver is provided. The OFDM receiver comprises a Fourier transform (FFT) module, a storage device, an equalizer, and a diversity combiner module. The Fourier transform module transforms a time-domain symbol into an OFDM symbol. The storage device stores OFDM symbols. When operated in a single chip mode, the storage device stores more OFDM symbols outputted from FFT module than operated in a diversity mode. The equalizer retrieves the OFDM symbols from the storage device or the FFT module, estimates the channel frequency response of a transmission channel, and equalizes the OFDM symbol according to the channel frequency response. When operated in the diversity mode, the diversity combiner module receives the OFDM symbols and an alignment signal from a diversity OFDM receiver.

19 Claims, 8 Drawing Sheets

OFDM RECEIVER HAVING MEMORY CAPABLE OF ACTING IN A SINGLE-CHIP MODE AND A DIVERSITY MODE

BACKGROUND OF THE INVENTION

Field of the Invention

The invention relates to decoding video signals, and, more particularly, to maintain the receiver performance while saving the memory cost.

In wireless communication systems, a signal may be sent at a certain frequency within a transmission path. Recent developments have enabled the simultaneous transmission of multiple signals over a single transmission path. One of these methods of simultaneous transmission is Frequency Division Multiplexing (FDM). In FDM, the transmission path is divided into sub-channels. Information (e.g. voice, video, audio, text, data, etc.) is modulated and transmitted over the sub-channels at different sub-carrier frequencies.

Figure 1:
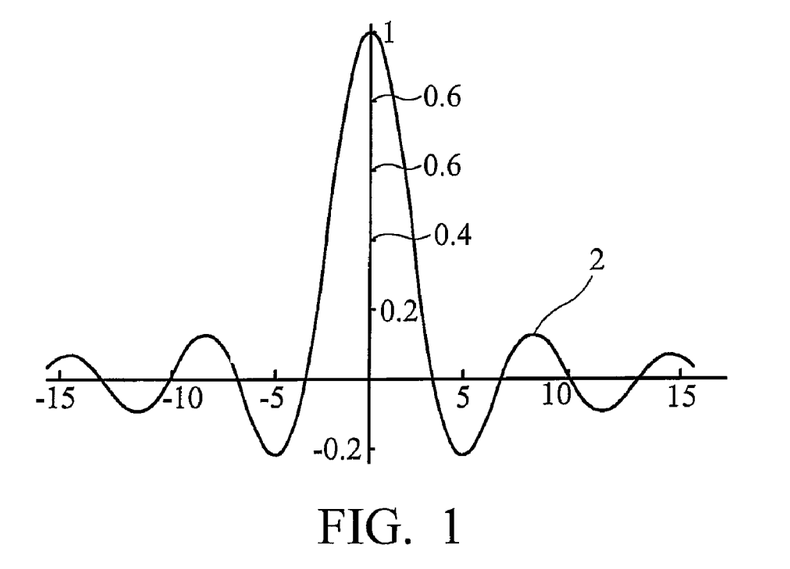
FIG. 1 shows a spectrum of a sinc function.
Figure 2:
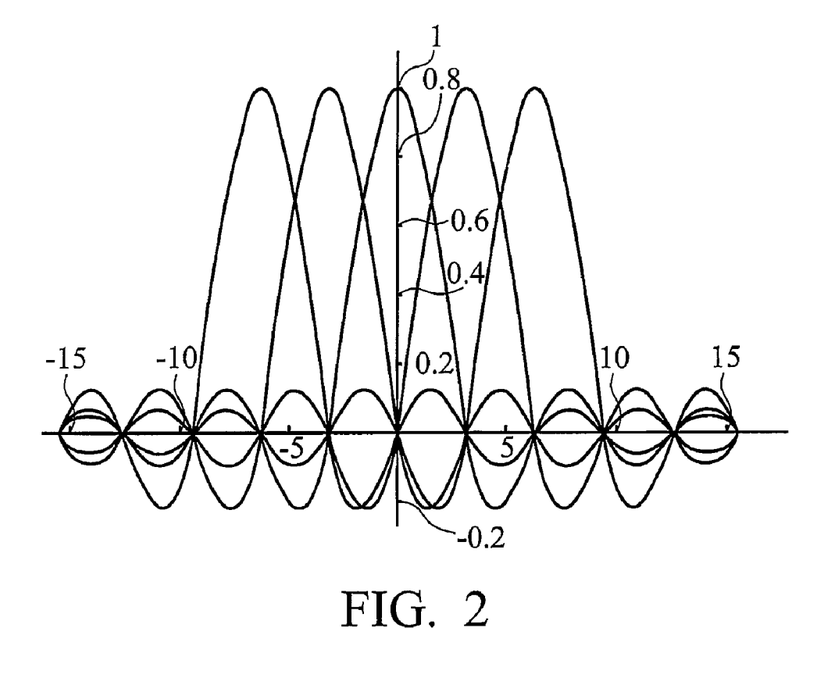
FIG. 2 shows a frequency spectrum for multiple carriers in a OFDM signal.

A particular type of FDM is Orthogonal Frequency Division Multiplexing (OFDM). In a typical OFDM transmission system, there are 2N OFDM sub-carriers. An OFDM system forms its symbol by taking m complex QAM symbols $X_m$, each modulating a sub-carrier with frequency $f_m = k/T_u$, where $T_u$ is the useful period of an OFDM symbol. Each OFDM sub-carrier displays a sinc x=(sin x)/x spectrum in the frequency domain. FIG. 1 shows a sinc spectrum. By spacing each of the 2N sub-carriers $1/T_u$ apart in the frequency domain, the primary peak of the sinc x spectrum of each sub-carrier coincides with a null of the spectrum of every other sub-carrier, as shown in FIG. 2. In this way, although the spectra of the sub-carriers overlap, they remain orthogonal to one another. An advantage of OFDM technology is that it is generally capable of overcoming multiple path effects. Another advantage of OFDM technology is that it can typically transmit and receive large quantities of information. Because of these advantages, extensive research has been devoted to advancing OFDM technology.

Channel estimation of OFDM receivers relies on pilot sub-carriers. Pilot sub-carriers are a sequence of frequencies in which the receiver already knows the transmitted value, thus, an OFDM receiver can use the pilot values to perform channel estimation. In general, the accuracy of the channel estimation is correspondent to the quantity of OFDM symbols utilized for channel estimation. Buffering the OFDM symbols, however, requires a large quantity of system memory. Thus, use of an OFDM receiver presents a tradeoff between required memory and channel estimation accuracy.

BRIEF SUMMARY OF THE INVENTION

Accordingly, the invention provides OFDM receivers with effective channel estimation. In one aspect of the invention, the OFDM receiver comprises a Fourier transform (FFT) module, a storage device, an equalizer, and a diversity combiner module. A synchronization and guard-interval-removing module may also be provided for receiving a transmitted signal, synchronizing the signal and removing the guard-interval of the synchronized signal to form a time-domain symbol. The Fourier transform module receives a time-domain symbol and transforms the time-domain symbol into a first OFDM symbol. The storage device, capable of operating in a single chip mode, stores a first set of OFDM symbols when operated in the single chip mode and stores a second set of OFDM symbols when operated in the diversity mode. The equalizer retrieves and equalizes the OFDM symbols from the storage device or the FFT module. The diversity combiner module receives the OFDM symbols and alignment signal when the storage device operates in the diversity mode.

In another aspect of the invention, an OFDM receiver comprising a Fourier transform (FFT) module, a storage device, an equalizer, and an MPE-FEC module is provided. A synchronization and guard-interval-removing module maybe provided for receiving a transmitted signal, synchronizing the signal and removing the guard-interval of the synchronized signal to form a time-domain symbol. The Fourier transform module receives a time-domain symbol and transforms the time-domain symbol into an OFDM symbol. The storage device capable of operating in a non-MPEFEC (non Multi-protocol Encapsulation Forward Error Correction) mode or a MPEFEC (Multiprotocol Encapsulation Forward Error Correction) mode, stores a first set of OFDM symbols when operated in the non-MPEFEC mode and stores a second set of OFDM symbols when operated in the MPEFEC mode. The equalizer retrieves OFDM symbols from the storage device or the FFT module, estimates the channel frequency response of a transmission channel according to pilot sub-carriers in the OFDM symbols, and equalizes the OFDM symbols according to the channel frequency response. The error control code decoder decodes the equalized OFDM symbols to generate TS stream. The MPE-FEC module, operating in either an active mode or an idle mode, receives the TS stream. When the MPE-FEC module operates in the idle mode, the storage device stores a first quantity of symbols. When the MPE-FEC module operates in the active mode, the storage device stores a second quantity of symbols and MPEFEC decoding information, wherein the first quantity exceeds the second quantity.

BRIEF DESCRIPTION OF THE DRAWINGS

The invention will become more fully understood from the detailed description, given herein below, and the accompanying drawings. The drawings and description are provided for purposes of illustration only, and, thus, are not intended to be limiting of the invention.

DETAILED DESCRIPTION OF THE INVENTION

Figure 3:
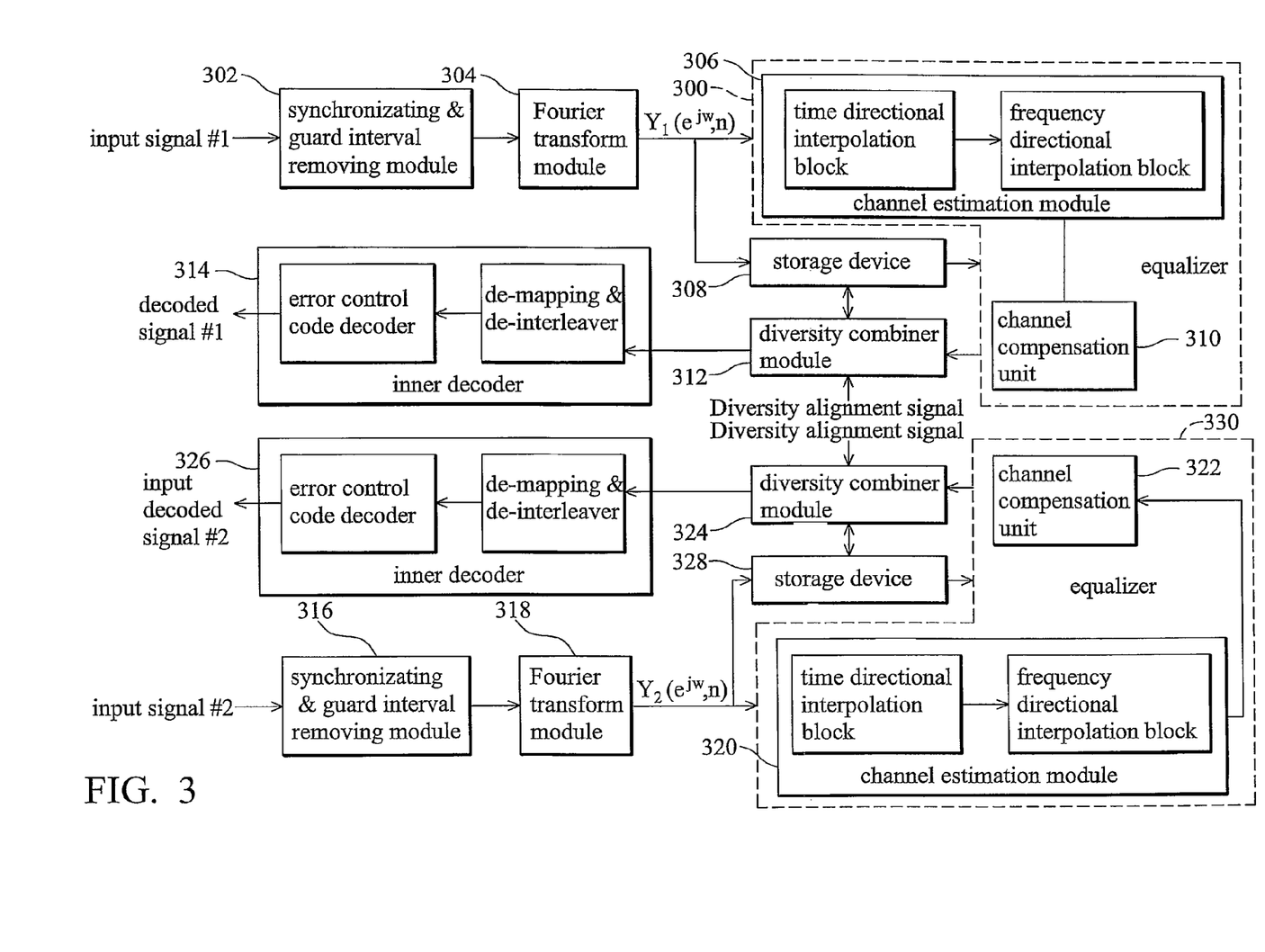
FIG. 3 shows a block of an OFDM receiver according to an embodiment of the invention.

FIG. 3 shows a block of an OFDM receiver according to one embodiment of the invention. The OFDM receiver comprises a synchronizing and guard-interval-removing module 302, a Fourier transform module 304, a storage device 308, an equalizer 300, a diversity combiner module 312, and an inner decoder 314. The synchronization and guard-interval-removing module 302 receives a transmitted signal, synchronizes the signal and removes the guard-interval of the synchronized signal to form a time-domain symbol. The Fourier transform module 304 receives a time-domain symbol and transforms the time-domain symbol into a first OFDM symbol $Y_1(e^{jw}, n)$, wherein w is from 0 to $2 \cdot \pi$ and n is a time index of the OFDM symbol. The storage device 308 either operating in either a diversity mode or a single chip mode, stores the OFDM symbols from $Y_1(e^{jw}, n-i_1)$ to $Y_1(e^{jw}, n+k_1)$ when operated in the single chip mode, and stores the OFDM symbols from $Y_1(e^{jw}, n-i_2)$ to $Y_1(e^{jw}, n+k_2)$ and diversity information when operated in the diversity mode, wherein $k_1$ exceeds $k_2$ and n–i is the time index former than n, and n+k is the time index later than n. $Y_1(e^{jw}, n-i_1)$ to $Y_1(e^{jw}, n+k_1)$ are denoted as the first set of symbols and $Y_1(e^{jw}, n-i_2)$ to $Y_1(e^{jw}, n+k_2)$ are denoted as the second set of symbols. The single chip mode indicates that the OFDM symbols are received by only one reception device. For example, the single chip mode utilizing only blocks 302-314 to receive OFDM symbols, and the diversity chip mode further utilizing another substantially the same blocks 316-330 to receive OFDM symbols. The equalizer 300 retrieves the OFDM symbols from the storage device 308, estimates the channel frequency response of a transmission channel according to pilot sub-carriers in the OFDM symbols, and equalizes the OFDM symbol $Y_1(e^{jw}, n)$ according to the channel frequency response. In the embodiment, the channel frequency response is estimated by a channel estimation module 306. When the storage device 308 operates in the diversity mode, the diversity combining module 312 receives the equalized OFDM symbols and the diversity information to combine OFDM symbols received by a diversity receiver. When the storage device 308 operates in the single chip mode, the diversity combining module 312 may be bypasses The inner decoder 314, comprises a de-mapping module and an error control code decoder, further decodes data from the storage device 308 or the equalizer 300. Thus, the storage device 308 is capable of storing the OFDM symbols from single receiver or a plurality of receivers by utilizing combine module. The number of symbols outputted from the FFT module 304 and stored in the storage device 308 is dynamically adjusted based on whether the system operates on the single-chip mode or diversity mode and how many OFDM symbols outputted from the FFT module 304 required for equalization. Thus, the storage device may act as the ring buffer.

In some embodiments, the OFDM symbols from $Y_1(e^{jw}, n-i_1)$ to $Y_1(e^{jw}, n+k_1)$ may be a series of the first OFDM symbols symmetrical with n. For example, symbols $Y_1(e^{jw}, n-i_1)$–$Y_1(e^{jw}, n+k_1)$ may be $Y_1(e^{jw}, n-4)$, $Y_1(e^{jw}, n-3)$, $Y_1(e^{jw}, n-2)$, $Y_1(e^{jw}, n-1)$, $Y_1(e^{jw}, n)$, $Y_1(e^{jw}, n+1)$, $Y_1(e^{jw}, n+2)$, $Y_1(e^{jw}, n+3)$ and $Y_1(e^{jw}, n+4)$. The OFDM symbols from $Y_1(e^{jw}, n-i_2)$ to $Y_1(e^{jw}, n+k_2)$ may be a series of OFDM symbols which is not symmetrical with n. For example, symbols $Y_1(e^{jw}, n-i_2)$–$Y_1(e^{jw}, n+k_2)$ may be $Y_1(e^{jw}, n-6)$, $Y_1(e^{jw}, n-5)$, $Y_1(e^{jw}, n-4)$, $Y_1(e^{jw}, n-3)$, $Y_1(e^{jw}, n-2)$, $Y_1(e^{jw}, n-1)$, $Y_1(e^{jw}, n)$, $Y_1(e^{jw}, n+1)$, and $Y_1(e^{jw}, n+2)$.

Analyzing symmetrical OFDM symbols typically provides more accurate channel estimation. Storing symmetrical OFDM symbols, however, occupies more memory. Because diversity combining is a technique to improve OFDM reception quality, when operated in the diversity mode, the storage device 308 stores less OFDM symbols outputted from the FFT module 304 but stores the OFDM symbols received from a diversity receiver for reducing the memory cost. When operated in the signal chip mode, the storage device 308 stores symmetric OFDM symbols to maintain reception quality.

The OFDM receiver may further comprises a second synchronization and guard-interval-removing module 316, a second Fourier transform module 318, a second equalizer 330, a second storage device 328, a second diversity combiner module 324, and a second inner decoder 326. The synchronization and guard-interval-removing module 316 receives a transmitted signal, synchronizes the signal and removes the guard-interval of the synchronized signal to form another time-domain symbol. The second Fourier transform module 318 receives a second time-domain symbol and transforms the second time-domain symbol into a second OFDM symbol $Y_2(e^{jw}, n)$, wherein w is from 0 to $2 \cdot \pi$, and n is a time index of the second OFDM symbol. The second storage device 328, either operating in either the diversity mode or the single chip mode, stores the OFDM symbols from $Y_2(e^{jw}, n-i_1)$ to $Y_2(e^{jw}, n+k_1)$ when operated in the single chip mode, and stores the OFDM symbols from $Y_2(e^{jw}, n-i_2)$ to $Y_2(e^{jw}, n+k_2)$ and diversity information when operated in the diversity mode. The second equalizer 330 retrieves the OFDM symbols from the second storage device 3328, estimates the channel frequency response of a transmission channel according to pilot sub-carriers in the OFDM symbols, and equalizes the OFDM symbol $Y_2(e^{jw}, n)$ according to the channel frequency response. In the embodiment, the channel frequency response is estimated by a channel estimation module 320. The second diversity combiner module 324 receives the OFDM symbols from the first diversity combiner module 312 and the alignment information to combine the OFDM symbols when the second storage devices 328 operates in the diversity mode. The storage device 328 stores the OFDMS symbols from the first diversity combiner module 312 and the OFDM symbols from the second FFT module and 318 or equalizer 330. The second inner decoder 326 further decodes data from the second diversity combiner module 324, the second storage device 328, or the second equalizer 330

Figure 4:
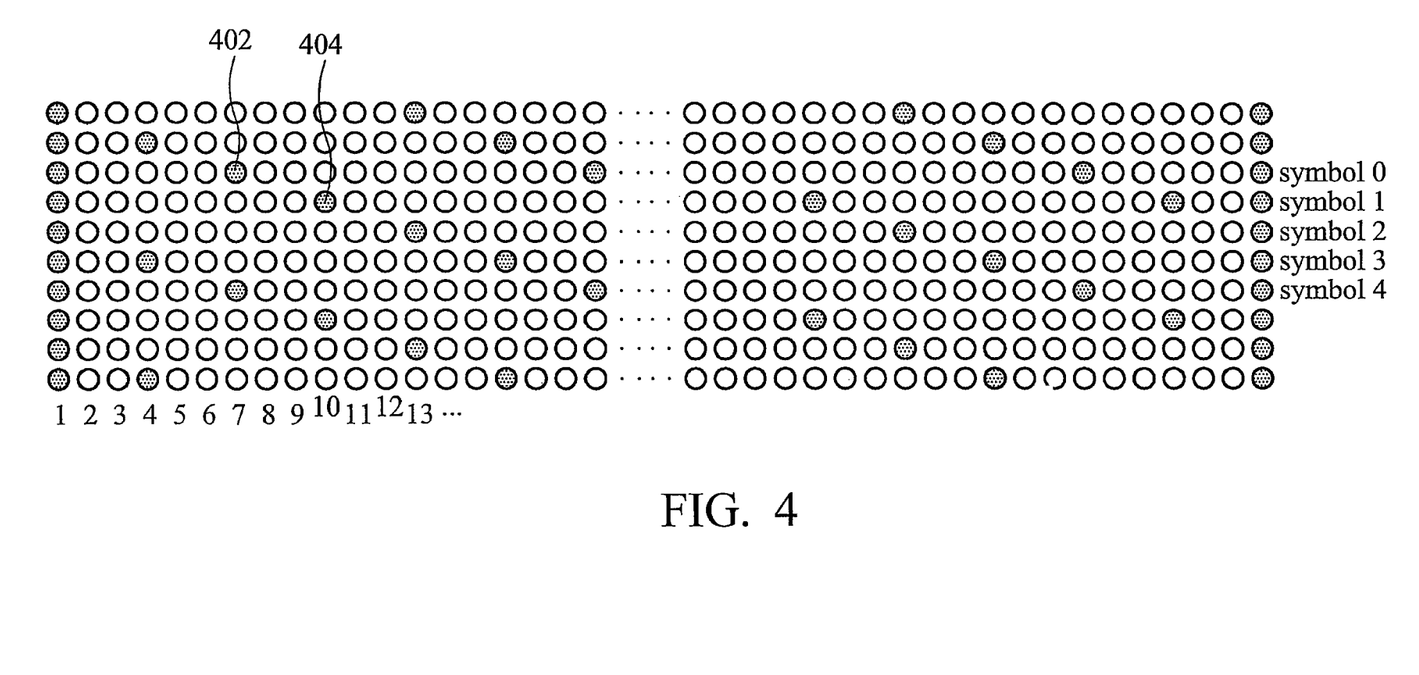
FIG. 4 shows the scattered pilots in a DVB-T OFDM frame.

The equalizers 300 and 330 comprise the channel estimation modules 306 and 320 and the channel compensation unit 310 and 322. The channel estimation modules 306 and 320 may each comprise a time direction interpolation block and a frequency direction interpolation block for varied pilot positions, for example, DVB-T (Digital Video Broadcasting-Terrestrial) systems. FIG. 4 shows the scattered pilots in a DVB-T OFDM frame. A DVB-T OFDM frame comprises 68 OFDM symbols. A pilot sub-carrier, represented as a dot in FIG. 3, is inserted every 11 data sub-carriers, and the pilot positions shift 3 sub-carriers after one symbol period. For example, a pilot 402 is inserted in position index 7 of symbol 0; at symbol 1, a pilot 404 is inserted in position index 10. Thus, a position will not be inserted any pilot until 4 symbol periods have passed, i.e., the position index 7 of symbol 4 will be inserted in a pilot, and so on. The time direction interpolator receives the plurality of pilots for at least 4 symbol periods, and interpolates pilots at the same position every 3 sub-carriers. For example, at symbol 1, symbol 2 and symbol 3, pseudo pilots in position index 7 are interpolated from symbol 0 and symbol 4. The pseudo pilot in position index 10 is interpolated from symbol 1 and symbol 5. The frequency direction interpolation block then interpolates pilots at each sub-carrier. For example, the pilots in position index 8 and 9 of symbol 1 are interpolated from pilots with position index 7 and 10. The pilot-interpolated symbol, representing the channel frequency response of a transmission channel, is sent to the equalizers 300 and 330.

Figure 9:
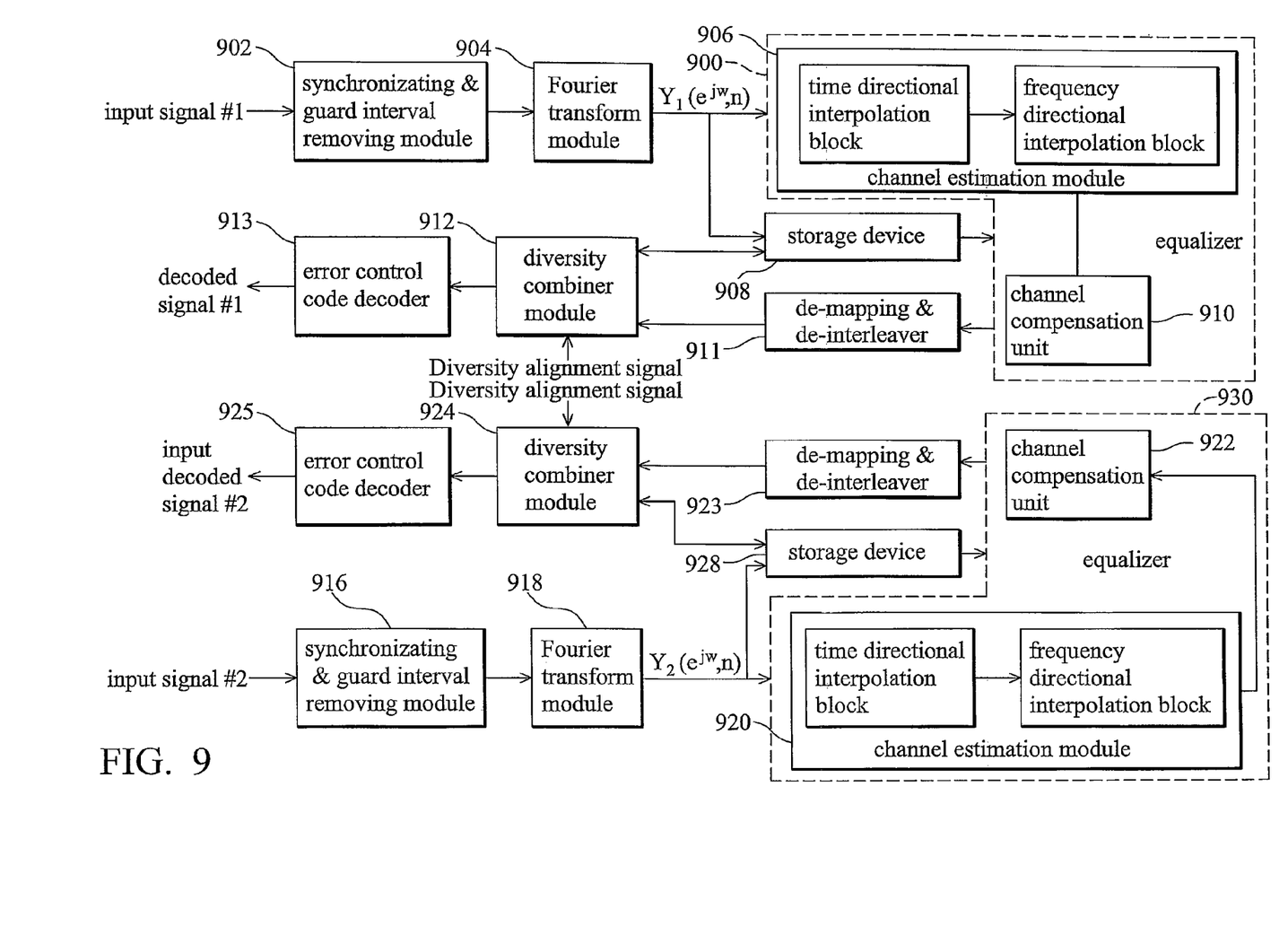
FIG. 9 shows a block of an OFDM receiver according to another embodiment of the invention.

FIG. 9 shows a block of an OFDM receiver according to one embodiment of the invention. The structure is similar to FIG. 3. The difference is that the diversity combiner module 924 is now taking the output from de-mapping and de-interleaver 923 to the diversity combiner module 912 for combining. In practice, the diversity combiner modules 912 or 924 may be placed after or before the module of de-mapping and de-interleaver 908 or 923.

Figure 5:
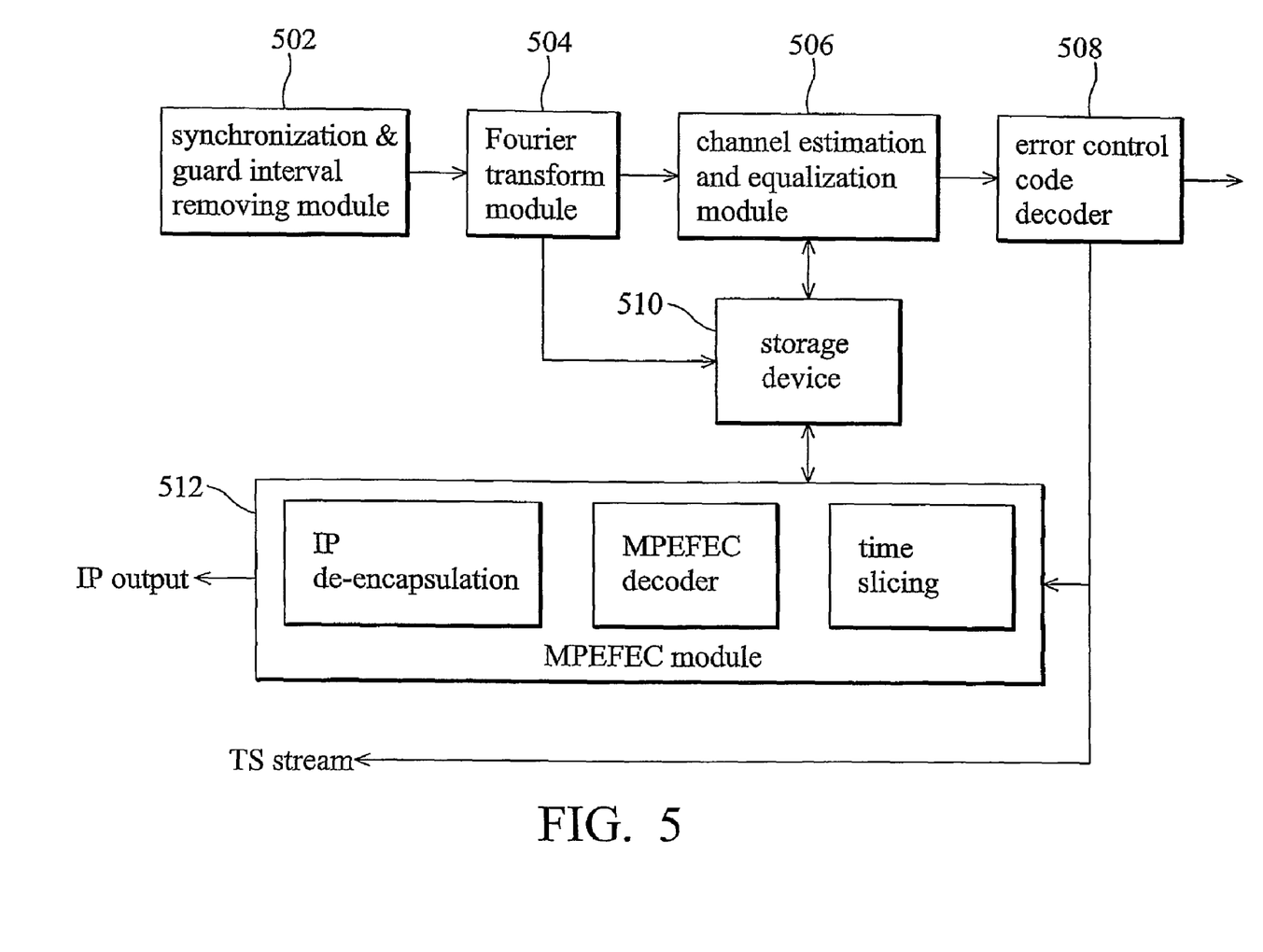
FIG. 5 shows a block diagram of an OFDM receiver according to another embodiment of the invention.

FIG. 5 shows a block diagram of an OFDM receiver according to another embodiment of the invention. The OFDM receiver comprises a synchronization and guard interval removing module 502, a Fourier transform module 504, a storage device 510, a channel estimation and equalization module 506, an error control code decoder 508, and a MPE-FEC module 512. The synchronization and guard-interval-removing module 502 receives a transmitted signal, synchronizes the signal and removes the guard-interval of the synchronized signal to form a time-domain symbol. The Fourier transform module 504 receives a time-domain symbol and transforms the time-domain symbol into an OFDM symbol. The storage device 510, either operating in either a non-MPEFEC mode or a MPEFEC mode, stores the OFDM symbols from $Y_1(e^{jw}, n-i_1)$ to $Y_1(e^{jw}, n+k_1)$ when operated in the non-MPEFEC mode, and stores the OFDM symbols from $Y_1(e^{jw}, n-i_2)$ to $Y_1(e^{jw}, n+k_2)$ and MPEFEC information when operated in the MPEFEC mode, wherein $k_1$ exceeds $k_2$ and n−i is the time index former than n, and n+k is the time index later than n. The OFDM symbols may store in the storage device for utilized by the channel estimation and equalization module 506 or directly used by MPEFEC module 512. The channel estimation and equalization module 506 retrieves OFDM symbols from the storage device 510 and Fourier transform module 504, estimates the channel frequency response of a transmission channel according to pilot sub-carriers in the OFDM symbols, and equalizes the OFDM symbols according to the channel frequency response. The error control code decoder 508 decodes the equalized OFDM symbols to generate a TS stream. The MPE-FEC module 512, operating in either an active mode or an idle mode, receives the TS stream. When the MPE-FEC module 512 operates in the idle mode, the storage device 510 stores a first quantity of symbols. When the MPE-FEC module 512 operates in the active mode, the storage device 510 stores a second quantity of symbols and MPEFEC decoding information, wherein the first quantity exceeds the second quantity.

Figure 6:
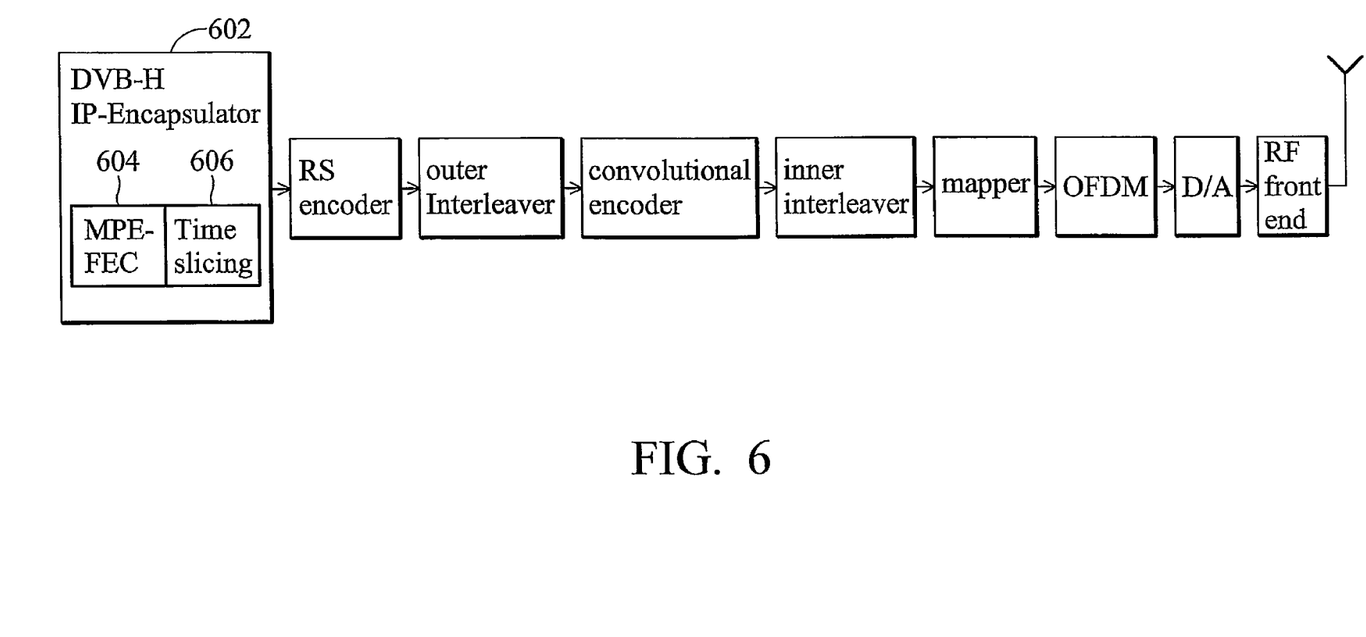
FIG. 6 shows a block diagram of a DVB-H transmitter.
Figure 7:
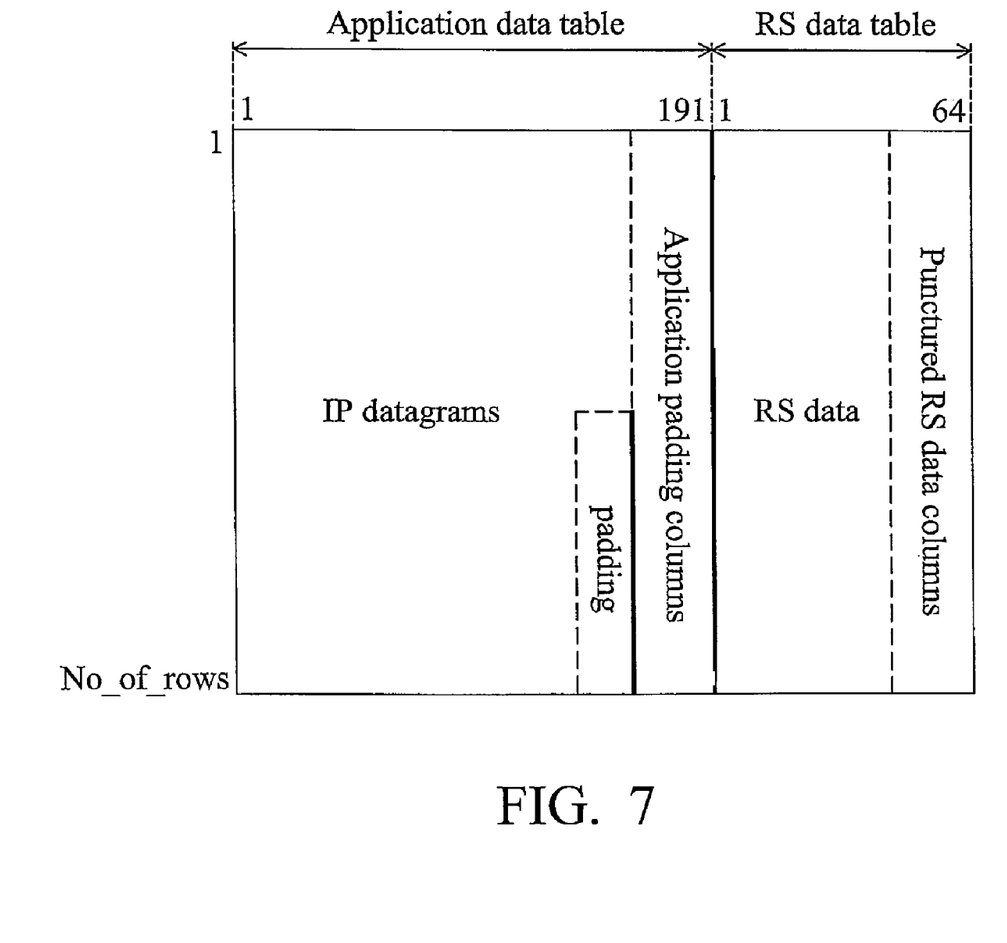
FIG. 7 shows a matrix of MPE-FEC.
Figure 8:
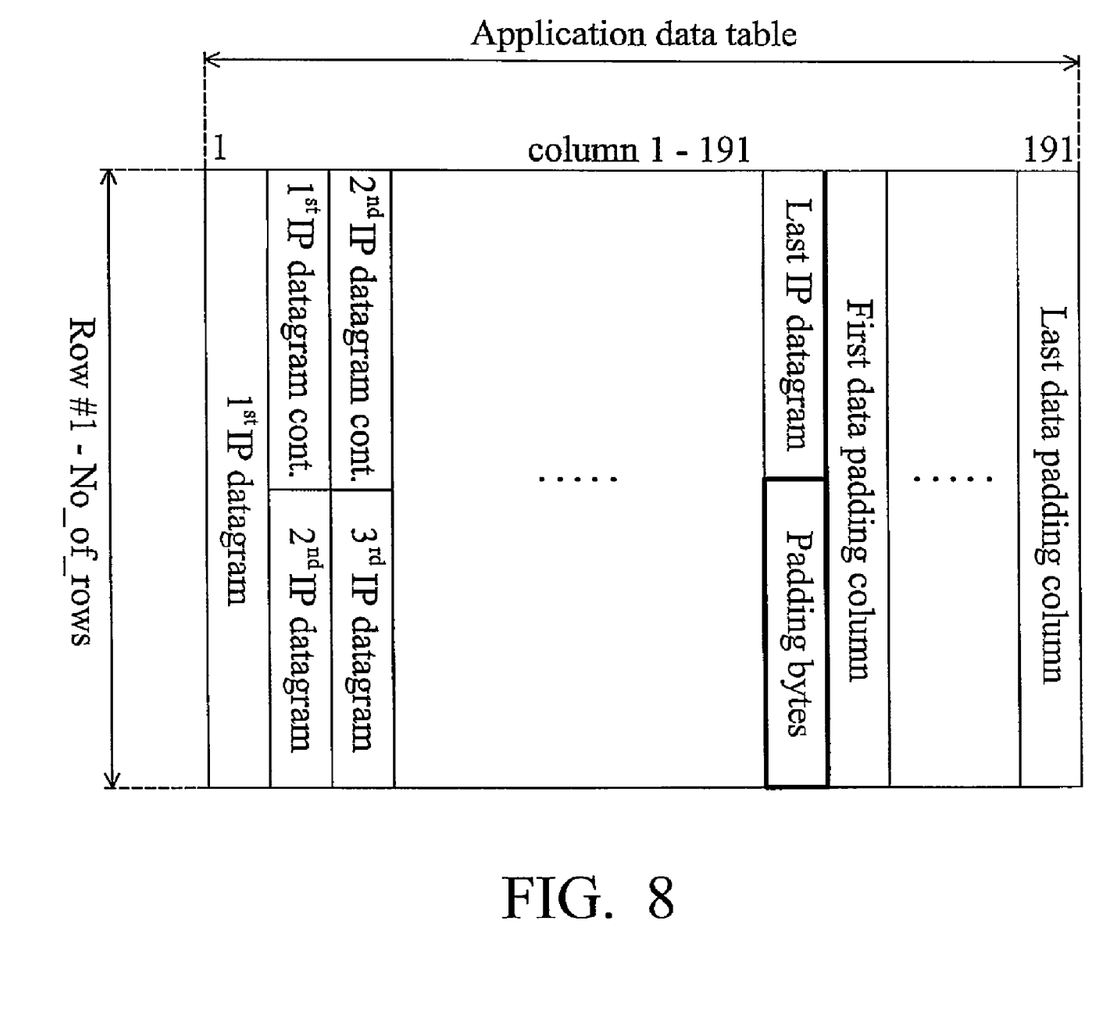
FIG. 8 shows the layout of the Application data table.

The MPE-FEC module 512 is designed to improve the tolerance of Doppler effect in mobile channels. Modern telecommunication standards, such as Digital Video Broadcast Hand-held (DVB-H), has specified the use of multiprotocol encapsulation forward error correction (MPE-FEC) to provide an additional layer of interleaving and error correction in order to provide a more robust signal in mobile environments. FIG. 6 shows a block diagram of a DVB-H transmitter. The DVB-H transmitter comprises a IP-encapsulator 202, an Reed-Solomon (RS) encoder, an outer interleaver, a convolutional encoder, an inner interleaver, a mapper, an OFDM modulator, a digital-to-analog converter (D/A), and a radio frequency (RF) front end. The inner and outer interleavers attempt to make the errors as randomly distributed as possible, so that the RS decoder and convolutional decoder (Viterbi) in receiver can take the most advantage from random errors. The IP-decapsulator 602 comprises a timing-slicing module 604 and a multiprotocol encapsulation-forward error correction (MPE-FEC) 606. The time-slicing 604 offers a flexible period and can be adapted to the DVB-H service. Time-slicing periods can be as high as 500 ms and as low as 50 ms. The MPE-FEC 606 offers an additional forward error correction function that allows the receiver to cope with particularly difficult reception situations. The MPE-FEC frame is arranged as a matrix with 255 columns and a flexible number of rows. FIG. 7 shows a matrix of MPE-FEC. The number of rows may vary from 1 to 1,024, depends on transmission conditions. Each position in the matrix holds an information byte. The left part of the MPE-FEC frame, consisting of the 191 leftmost columns, are dedicated for IP datagram and possible padding, and is called the Application data table. FIG. 8 shows the layout of the Application data table. The right part of the MPE-FEC frame, consisting of the 64 rightmost columns, is dedicated for the parity information of the FEC code and is called the RS data table. Each byte position in the Application data table has an address ranging from 1 to 191 times number of rows (No_of_rows). In the same way, each byte position in the RS data table has an address ranging from 1 to 64 times number of rows. By adding parity information calculated from the IP datagram and sending this parity data in separate MPE-FEC sections, error-free IP datagram can be output (after MPE-FEC decoding) even under bad reception conditions. Each MPE-FEC section contains 16 bytes overhead caused by the header and CRC-32. By using the cyclic redundancy check (CRC) in the MPE-FEC packet header, it flags the MPE-FEC packet contents as unreliable if the CRC check fails. According to DVB-H specification, time-slicing is mandatory in a DVB-H system, and MPE-FEC is optional to use. The MPE-FEC standard is backward compatible with non-MPE-FEC-compliant receivers.

The MPE-FEC module 516 comprises a time-slicing module, a MPE-FEC decoder and an IP de-encapsulation module. The MPE-FEC module 516 can be occasionally turned on. When an MPE-FEC burst is received, the MPE-FEC module 512 buffers the data within its memory for consumption during the time intervals. For every received section belonging to the Application data table or to the RS data table, the MPE-FEC module 512 looks in the section header for the start address (row number and column number) of the MPE-FEC frame within the section and is then able to put the MPE-FEC frame in the right position in the respective table. After this procedure, all received bursts can then be marked as either "reliable" or "unreliable" according to the CRC-32 checksum. Since the MPE-FEC may be ignored, the MPE-FEC module 512 determines if the all the MPE-FEC burst are marked "reliable". If so, the MPE-FEC module 512 remains off to save power. Otherwise, the MPE-FEC module 512 is turned on.

In some embodiments, the OFDM symbols from $Y_1(e^{jw}, n-i_1)$ to $Y_1(e^{jw}, n+k_1)$ may be a series of the first OFDM symbols symmetrical with n. For example, symbols $Y_1(e^{jw}, n-i_1)$-$Y_1(e^{jw}, n+k_1)$ may be $Y_1(e^{jw}, n-4)$, $Y_1(e^{jw}, n-3)$, $Y_1(e^{jw}, n-2)$, $Y_1(e^{jw}, n-1)$, $Y_1(e^{jw}, n)$, $Y_1(e^{jw}, n+1)$, $Y_1(e^{jw}, n+2)$, $Y_1(e^{jw}, n+3)$, and $Y_1(e^{jw}, n+4)$. The OFDM symbols from $Y_1(e^{jw}, n-i_2)$ to $Y_1(e^{jw}, n+k_2)$ may be a series of OFDM symbols which is not symmetrical with n. For example, symbols $Y_1(e^{jw}, n-i_2)$-$Y_1(e^{jw}, n+k_2)$ may be $Y_1(e^{jw}, n-6)$, $Y_1(e^{jw}, n-5)$, $Y_1(e^{jw}, n-4)$, $Y_1(e^{jw}, n-3)$, $Y_1(e^{jw}, n-2)$, $Y_1(e^{jw}, n-1)$, $Y_1(e^{jw}, n)$, $Y_1(e^{jw}, n+1)$, and $Y_1(e^{jw}, n+2)$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An OFDM receiver for receiving signals transmitted at radio frequency and having a storage device to be shared by an equalizer and a diversity combiner module, comprising:
 a (FFT) module receiving a time-domain symbol and transforming the time-domain symbol into an OFDM symbol;
 the storage device, capable of operating in a diversity mode or a single chip mode, storing a first set of OFDM symbols when operated in the single chip mode, and storing a second set of OFDM symbols when operated in the diversity mode;

the equalizer, coupled to the storage device, for retrieving and equalizing the OFDM symbols from at least one of the storage device and the FFT module; and the diversity combiner module, coupled to the storage device, for receiving an alignment signal and data symbols from a diversity OFDM receiver, wherein the first set of OFDM symbols is different from the second set of OFDM symbols and the first set of OFDM symbols comprises more the OFDM symbols outputted from the FFT module than the second set of OFDM symbols, whereby the storage device that receives symbols from the diversity combiner is capable of storing more OFDM symbols outputted from the FFT module to generate a better estimation result from the equalizer via the diversity combiner in the single chip mode and the storage device is capable of storing less OFDM symbols outputted from the FFT module for having an extra space to store the OFDM symbols received from the diversity OFDM receiver in the diversity mode.

2. The OFDM receiver as claimed in claim 1, wherein the alignment signal includes information for combining the OFDM symbols outputted from the FFT module and the data symbols received from the diversity OFDM receiver.

3. The OFDM receiver as claimed in claim 1, wherein the size of the first set of the OFDM symbols and the size of the second set of the OFDM symbols are dynamically adjusted.

4. The OFDM receiver as claimed in claim 1, wherein the size of the first set of the OFDM symbols and the size of the second set of the OFDM symbols are dynamically adjusted according to an amount of OFDM symbols as equalizer required.

5. The OFDM receiver as claimed in claim 1, further comprising a synchronizing and guard-interval-removing module, wherein the synchronization and guard-interval-removing module receives a transmitted signal, synchronizes the signal and removes the guard-interval of the synchronized signal to form the time-domain symbol.

6. The OFDM receiver as claimed in claim 1, wherein the equalizer comprises an estimation module for estimating a channel frequency response of a transmission channel according to pilot sub-carriers in the OFDM symbols outputted from the FFT module.

7. The OFDM receiver as claimed in claim 6, wherein the estimation module further comprises:
    a time direction interpolation block for interpolating pilot sub-carriers of OFDM symbols to form a plurality of pseudo pilot sub-carriers; and
    a frequency direction interpolation block receiving the plurality of pseudo pilot sub-carriers and interpolating all the sub-carriers of an OFDM symbol according to the pseudo pilot sub-carriers and the pilot sub-carriers.

8. The OFDM receiver as claimed in claim 1 further comprises a de-mapping module and an error control code decoder.

9. The OFDM receiver as claimed in claim 8, wherein the OFDM symbols outputted from the FFT module are further de-mapped or de-interleaved in the de-mapping module and sent the de-mapped or de-interleaved output to the diversity combiner module for combining with the data symbols from the diversity OFDM receiver.

10. The OFDM receiver as claimed in claim 9, wherein the data symbols from the diversity OFDM receiver are de-mapped or de-interleaved.

11. An OFDM receiver for receiving signals transmitted at radio frequency, comprising:
    a Fourier transform (FFT) module receiving a time-domain symbol and transforming the time-domain symbol into an OFDM symbol 1;
    a storage device that receives symbols from a diversity combiner, capable of operating in a non-MPEFEC mode or a MPEFEC mode, storing a first set of OFDM symbols when operated in the non-MPEFEC mode, and storing a second set of OFDM symbols when operated in the MPEFEC mode;
    an equalizer that output to said diversity combiner and for retrieving OFDM symbols from the storage device or the FFT module, estimating the channel frequency response of a transmission channel according to pilot sub-carriers in the OFDM symbols, and
    equalizing the OFDM symbols according to the channel frequency response;
    an error control code decoder decoding the equalized OFDM symbols to generate transport streams; and
    an MPEFEC module operating in either the MPEFEC mode or the non-MPEFEC mode, when operated in the MPEFEC mode, the MPEFEC module forwards the MPEFEC information and the OFDM symbols from the storage device.

12. The OFDM receiver as claimed in claim 11, wherein the MPE-FEC module comprises a (Forward Error Correction) FEC decoder.

13. The OFDM receiver as claimed in claim 11, further comprising a synchronizing and guard-interval-removing module, wherein the synchronization and guard-interval-removing module receives a transmitted signal, synchronizes the signal and removes the guard-interval of the synchronized signal to form the time-domain symbol.

14. The OFDM receiver as claimed in claim 11 further comprises a de-mapping module and an error control code decoder.

15. A method for receiving signals transmitted at radio frequency and having a storage device to be shared by an equalizer and a diversity combiner module, comprising:
    providing a Fourier transformer (FFT) module for receiving a time-domain symbol and transforming the time-domain symbol into an OFDM symbol;
    storing a first set of OFDM symbols in the storage device that receives symbols from the diversity combiner when operated in the single chip mode, and storing a second set of OFDM symbols when operated in the diversity mode;
    retrieving and equalizing the OFDM symbols, wherein the OFDM symbols are retrieved from the storage device or directly from the FFT module ; and
    receiving an alignment signal and data symbols from a diversity OFDM receiver;
    wherein the first set of OFDM symbols is different from the second set of OFDM symbols and the first set of OFDM symbols comprises more the OFDM symbols outputted from the FFT module than the second set of OFDM symbols,
    whereby more OFDM symbols outputted from the FFT module are stored by receiving symbols from said diversity combiner module to generate a better estimation result while the storage device acts under the single chip mode and less OFDM symbols outputted from the FFT module are stored so that there are extra spaces in the storage device to store the OFDM symbols received from the diversity OFDM receiver while the storage device acts under the diversity mode.

16. The method as claimed in claim 15, wherein the alignment signal includes information for combining the OFDM symbols outputted from the FFT module and the data symbols from the diversity OFDM receiver.

17. The OFDM receiver as claimed in claim 15, wherein the size of the first set of the OFDM symbols and the size of the second set of the OFDM symbols are dynamically adjusted.

18. The OFDM receiver as claimed in claim 15, wherein the size of the first set of the OFDM symbols and the size of the second set of the OFDM symbols are dynamically adjusted according to an amount of OFDM symbols for performing the equalizing step.

19. The OFDM receiver as claimed in claim 15, the OFDM symbols outputted from the FFT module are further de-mapped or de-interleaved prior and the de-mapped or de-interleaved output are combined with the data symbols from the diversity OFDM receiver.

\* \* \* \* \*